INVENTOR
Paul Paech

Patented Mar. 19, 1929.

1,705,675

UNITED STATES PATENT OFFICE.

PAUL PAECH, OF BERLIN-STEGLITZ, GERMANY, ASSIGNOR TO WESTINGHOUSE ELECTRIC & MANUFACTURING COMPANY, A CORPORATION OF PENNSYLVANIA.

REGULATOR SYSTEM.

Application filed October 8, 1927, Serial No. 224,908, and in Germany October 9, 1926.

My invention relates to regulator systems and more particularly to regulator systems for controlling the excitation of dynamo-electric machines.

An object of my invention is to provide means for decreasing the time interval during which the excitation current of a dynamo-electric machine builds up in response to the action of a regulator governing the excitation of the machine.

Figure 1:
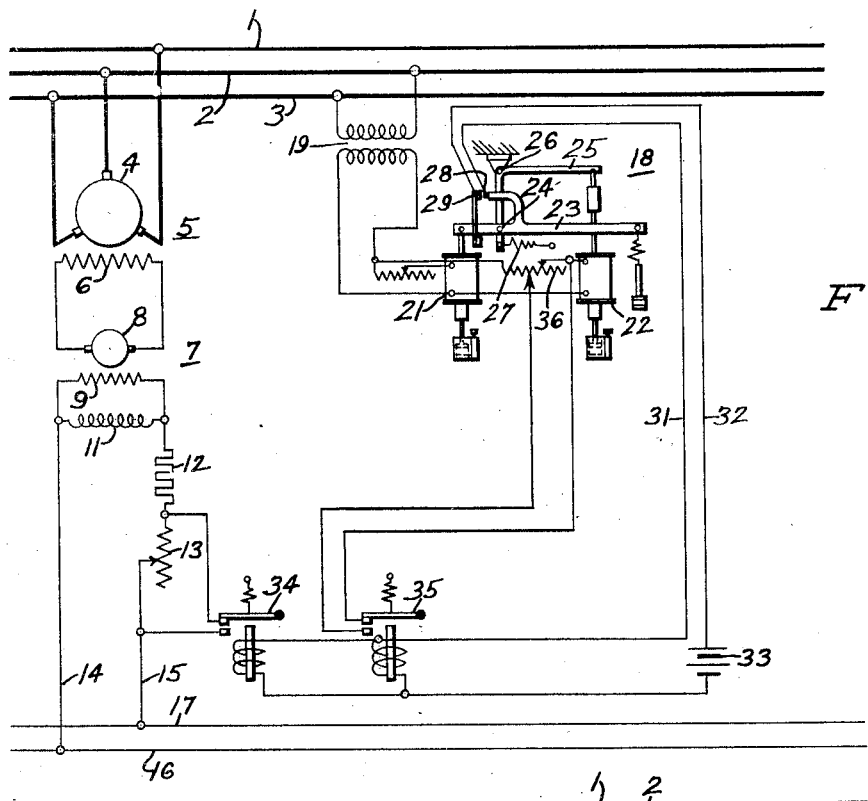
Figure 2:
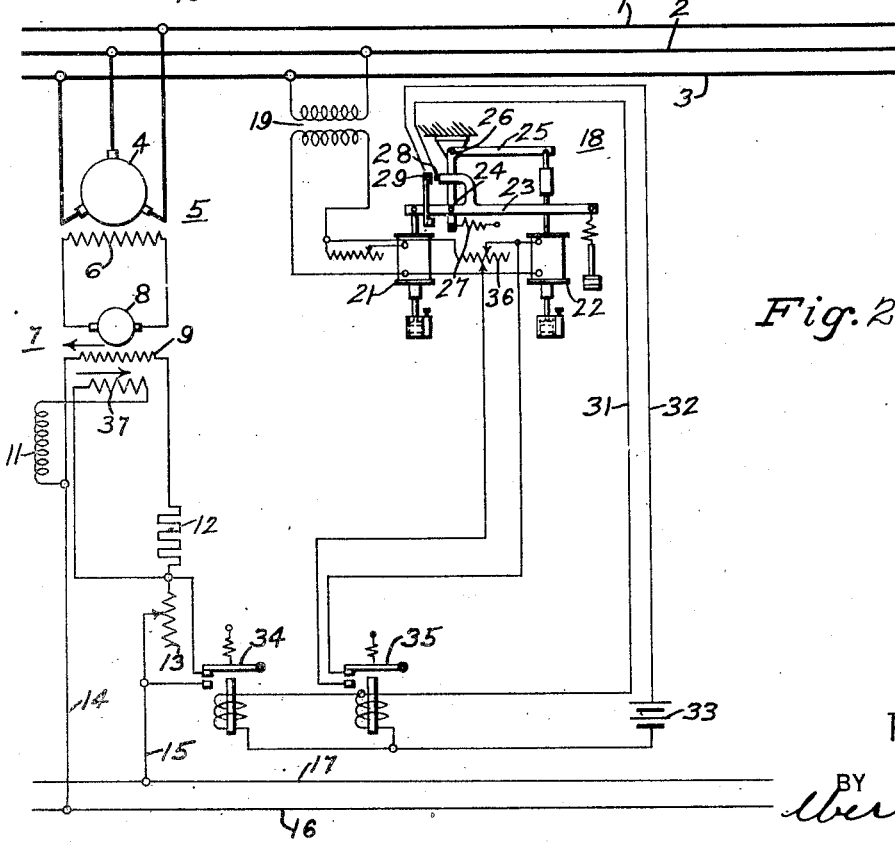

My invention will be better understood by reference to the accompanying drawings, in which, Figure 1 is a schematic view of apparatus embodying the preferred form of my invention, and Figure 2 is a schematic view of a second form of apparatus embodying my invention.

Referring to the drawing, and more particularly to Figure 1 thereof, the conductors 1, 2 and 3 comprise a transmission line to which the armature windings 4 of a dynamo-electric machine 5 are connected. The machine 5 may be a generator or a synchronous condenser and is provided with a field winding 6 connected to be energized from an exciter generator 7, which is provided with an armature winding 8 and a field winding 9.

A reactor or choke coil 11 is connected in parallel circuit relation with the field winding 9 and is designed to have an inductance greater than that of the field winding.

The field winding 9 is connected through a high speed resistor 12 and a regulating resistor 13 by means of conductors 14 and 15 to a source of electrical energy represented by the conductors 16 and 17. The resistor 12 operates to increase the rate of current changes in the field winding in response to a change in the voltage applied to the field winding circuit. A variable resistor 13 is provided, by means of which the field circuit of the exciter generator is regulated, and may be any well known form of rheostat.

For the purpose of controlling the regulating resistor 13, any conventional form of regulator such as 18, may be employed. The regulator 18 is connected through a voltage transformer 19 in a manner to be responsive to voltage changes in the transmission line 1, 2, 3. The regulator 18 comprises a regulating electro-magnet 21, that is connected to actuate the lever 23 about a movable pivot 24, and an anti-hunting electro-magnet 22, that is connected to actuate the bell crank lever 25 about a fixed pivot 26, upon which the lever 23 is pivotally supported at the point 24. The lever 25 is normally biased by a spring 27 in a direction to aid the pull of the electromagnet 22. The lever 23 carries a contact member 28 which is adapted to engage a fixed contact member 29 and to close a circuit through conductors 31, 32, and any suitable source of energy 33 to energize the operating coils of the relays 34 and 35.

The operation of the regulator system is as follows: If the voltage of the transmission line drops below the normal value which the regulator is adjusted to maintain, the core of the electro-magnet 21 will move downwardly, actuating the lever 23 in a counter-clockwise direction and causing engagement of the contact members 28 and 29, thus closing a circuit through the operating coils of relays 34 and 35. The relay 34 closes and short circuits the resistor 13 thus increasing the voltage applied to the field winding 9 of the exciter generator, which causes the voltage of the exciter generator 7 and also the excitation of the main dynamo-electric machine 5 to increase. The relay 35 closes simultaneously with the relay 34 and short circuits a portion of a resistor 36, connected in circuit with the anti-hunting magnet 22, causing the armature of this magnet to be moved upwardly and to separate the contact members 28 and 29 prior to an appreciable upward movement of the armature of the electro-magnet 21, which will move upwardly as the voltage in transmission line rises. The regulator will continue to vibrate as described, opening and closing its contact members for a greater or lesser period of time, depending upon the correction in voltage required.

Upon a decrease in the effective value of the regulating resistor 13 in the field circuit of the exciter generator 7, occasioned by short-circuiting the resistor 13 by means of the relay 34, the current through the conductors 14 and 15 will increase. Since the inductance of the reactor 11 is greater than that of the field winding 9, it will offer a higher effective resistance to the flow of current. Therefore a larger proportion of the increased current in the circuit including conductors 14 and 15 will initially flow through the winding 9 during the transient condition of the circuit than will be normal after the current of the circuit has again become stable. There is an initial increase in current in the field winding 9 during the transient circuit conditions in excess of the normal value for the voltage impressed on the circuit. This current value increases temporarily during the transient conditions of the circuit, or while current in the reactor 11 builds up and then returns to the normal value for the condition of the circuit having the changed value of resistance therein. This action causes a more rapid increase in the exciter voltage than would exist without the action of the reactor 11. The resistor 12 also aids in increasing the rate of current change in the field winding 9. The greater the value of ohmic resistance in proportion to the value of reactance in series in the field winding circuit, the greater will be the rate of change in the circuit current in response to a change in the voltage impressed thereon.

Referring to Figure 2 of the drawing, a field winding 37 is provided in series circuit relation with the reactor 11 and differentially related to the field winding 9, so that the flux produced by the electro-magnet 37 opposes that produced by the winding 9. This modification of my invention produces a rapid rate of response in the voltage of exciter generator 7 upon an increase in the excitation current of the field-magnet-winding circuit. When the resistor 13 is short-circuited, the current in the field winding 9 increases in the same manner as in the form of the invention shown in Fig. 1, since the combined reactance of the reactor 11 and the auxiliary field winding 37 is greater than that of the field winding 9. The field winding 37, however, being in series circuit relation with the reactor 11, builds up slowly so that its de-energization effect upon the field winding of the exciter generator is a minimum when the effect of the field winding 9 is a maximum during the transient conditions of the field winding circuit caused by short circuiting the resistor 13. The combined excitation of the machine 7 will be the flux produced by the field winding 9, minus that produced by the field winding 37. The field winding 37 is shown connected so that the current therethrough does not pass through the high speed resistor 12 which operates to increase the rate of response of field winding 9.

Since modifications may be made in the circuits and apparatus disclosed without departing from the spirit of my invention, I do not wish to be limited other than by the scope of the appended claims.

I claim as my invention:

1. In a regulator system, a dynamo-electric machine having a field winding, a separate source of power for energizing said field winding, a reactor connected to said source of power in parallel circuit relation to said field winding, and a regulator for governing the excitation of said field winding.

2. In a regulator system, a dynamo-electric machine, a transmission line connected thereto, a field winding for governing the excitation of said machine, and a reactor connected in parallel circuit relation with said field winding, a resistor connected in series circuit relation with said field winding and with said reactor, and regulator means connected to said transmission line and responsive to a characteristic thereof for controlling the effective value of said resistor.

3. In a regulator system, a dynamo-electric machine having a field winding, a reactor connected in parallel circuit relation to said field winding, a resistor connected in series circuit relation with said field winding and said reactor, and a regulator for governing the effective value of said resistor to control the excitation of said machine.

4. In a regulator system, a transmission line, a dynamo-electric machine connected to said transmission line and provided with a field winding, an exciter generator for energizing said field winding, said exciter generator being also provided with a field winding, reactor means connected in parallel circuit relation with said field winding, a source of energy for energizing said field winding and said reactor, and regulator means actuated in accordance with a characteristic of said transmission line for controlling the circuit of said field winding and said reactor.

5. In a regulator system, a dynamo-electric machine having a field winding, an auxiliary field winding and a reactor connected in series circuit relation with each other and in parallel circuit relation to said first named field winding, and a regulator for governing the excitation of said field windings.

6. In a regulator system, a dynamo-electric machine having a plurality of field windings, a reactor connected in series circuit relation with one of said field windings and in parallel circuit relation with another of said field windings, and regulator means for controlling the excitation of said field windings.

7. In a regulator system, a dynamo-electric machine having differentially related field windings connected in parallel circuit relation, a reactor connected in series circuit relation with one of said field windings, resistor means connected in series circuit relation with said field windings, and a regulator for governing said resistor means to control the excitation of said machine.

8. In a regulator system, a dynamo-electric machine having a field winding, a resistor connected in series circuit relation with said field winding, a reactor connected in parallel circuit relation to said field winding, said reactor and said resistor being effective to increase the rate of response of said field winding upon an increase in applied voltage to the field winding circuit, and a regulator for governing the field winding circuit.

In testimony whereof, I have hereunto subscribed my name this 19th day of September, 1927.

PAUL PAECH.